United States Patent [19]

Woodruff

[11] B 3,925,233
[45] Dec. 9, 1975

[54] FORMALDEHYDE-HEXAMETHYLENE TETRAMINE COMPOSITIONS

[75] Inventor: Benjamin T. Woodruff, Charleston, W. Va.

[73] Assignee: E. I. Du Pont de Nemours & Company, Wilmington, Del.

[22] Filed: Dec. 4, 1972

[21] Appl. No.: 311,977

[44] Published under the Trial Voluntary Protest Program on January 28, 1975 as document no. B 311,977.

[52] U.S. Cl. .................................. 252/182; 252/189
[51] Int. Cl.² .......................................... C09K 3/00
[58] Field of Search ................... 252/182, 189, 438

[56] References Cited

UNITED STATES PATENTS 2,496,595   2/1950   Moyer et al. .................... 252/8.55 E

*Primary Examiner*—Stephen J. Lechert, Jr.

[57] ABSTRACT

A stable, aqueous solution of up to about 80% by weight hexamethylene tetramine and formaldehyde is made by slurrying 2 to 3.3 moles of formaldehyde in aqueous solution with one mole of hexamethylene tetramine, adding an acidic material and heating the mixture at a temperature between 60° and 90°C.

6 Claims, No Drawings

FORMALDEHYDE-HEXAMETHYLENE TETRAMINE COMPOSITIONS

BACKGROUND OF THE INVENTION

There is a need for stable solutions of hexamethylene tetramine and aqueous formaldehyde wherein the mole ratio of formaldehyde to hexamethylene tetramine ranges from 2:1 to 3.3:1. Such solutions are useful in producing foundry mold cures and shell molds and also in the hardening of two-stage phenolic resins.

The prior art, e.g., U.S. Pat. No. 2,496,595, has taught the preparation of dilute compositions of hexamethylene tetramine and formaldehyde having different mole ratios. However, the need still exists for strong solutions at the desired mole ratios.

SUMMARY OF THE INVENTION

I have discovered that stable aqueous solutions of up to about 80% by weight hexamethylene tetramine and formaldehyde where the mole ratio of formaldehyde to hexamethylene tetramine ranges from 2:1 to 3.3:1 can be made by making a slurry of hexamethylene tetramine in an aqueous solution of up to 60% by weight formaldehyde to obtain the desired mole ratio. To the slurry is then added an acidic material, e.g., a mineral acid, an organic acid, or an acid reacting salt, in the amount of one mole of acid to two moles of hexamethylene tetramine. Additional acidic material can be added, however there is no advantage in so doing, and the resulting product may have a pH outside the desired range. The mixture is then heated to a temperature between 60° and 90°C. for a period of time necessary to produce a clear solution.

The product solution has a pH which varies from 7.4 to 8.4, a density which varies from 1.15 to 1.35 grams per ml. and a viscosity which ranges from 20 to 55Cp at 25°C.

The product solution is very useful since over 90% of the formaldehyde, including formaldehyde as such and the formaldehyde equivalent of the hexamethylene tetramine becomes available when the solution is heated to 100°C.

DESCRIPTION OF THE INVENTION

The stable aqueous solutions of the invention are made by making a mixture of hexamethylene tetramine and aqueous formaldehyde to obtain the desired mole ration of formaldehyde to hexamethylene tetramine, 2:1 to 3.3:1. The hexamethylene tetramine can be either in solid form or as a solution, e.g., a solution of 70 parts of solid in 100 parts of water. The aqueous formaldehyde solution can contain up to 60% by weight formaldehyde; generally a 37% by weight solution is employed.

To the mixture is added an acidic material. To obtain a clear, stable solution a minimum of one equivalent of acid to two mols of hexamethylene tetramine is needed; the resulting solution will have a pH between 7.4 and 8.4.

The acidic material can be a mineral acid, e.g., sulfuric acid, nitric acid, hydrocloric acid, etc., a strong organic acid, e.g., acetic or formic acid; or an acid reacting salt such as ammonium chloride, ammonium sulfate or ammonium nitrate. The choice of acidic material is not critical and the chief requirement is its hydrogen ion content, i.e., it should be a reasonably strong acid. For example, oxalic acid is not as effective as the mineral acids on an equivalent basis as it does not furnish two hydrogen ions per mole.

The mixture is then heated at a temperature of 60° to 90°C. until a clear solution results. The temperatures can be raised up to the point where the formaldehyde boils off, i.e., 115°C., but such temperatures are not necessary. It should also be noted that the reaction itself will produce some temperature rise, thus the acidic material employed and its rate or addition should be selected to avoid an uncontrollable temperature rise. The heating can require from one to ten minutes and generally about two minutes. Heating for longer periods, e.g., several hours, is not harmful but does not provide any reasonable benefit.

The resulting solution remains clear, even at temperatures as low as 0°C. The solution has a stable pH of 7.4 to 8.4, a density of 1.20 to 1.35 grams per ml. and a viscosity of 20 to 55 centiposes (Cp) as measured with a Brookfield Model 1VF viscometer using a No. 2 spindle at 30 rpm. A Corning Model 12 Research pH meter can be used for pH readings. Both viscosity and pH were determined at 25°C.

The following Example is offered to illustrate the product and the process of the invention. All parts are parts by weight unless otherwise indicated.

EXAMPLE

Three solutions were prepared using the following ingredients:

|  | 1 | 2 | 3 |
|---|---|---|---|
| Hexamethylene Tetramine | 39.4 | 42.2 | 34.6 |
| Formaldehyde | 25.5 | 27.3 | 31.8 |
| Water | 29.8 | 23.1 | 26.0 |
| Hydrochloric Acid | 5.3 | — | — |
| Formic Acid | — | 7.4 | — |
| Ammonium Chloride | — | — | 7.6 |

The solutions were heated 90°C., held for 2 to ten minutes and resulted in stable, clear solutions having the following properties:

|  | 1 | 2 | 3 |
|---|---|---|---|
| Density, grams/ml. | 1.17 | 1.25 | 1.22 |
| Viscosity, Cp | 24 | 50 | 30 |
| pH | 8.09 | 7.48 | 8.04 |

The solutions can be used in binding sand molds or sand mold cones by furnishing high concentrations of formaldehyde. Thus, they can replace the dry hexamethylene tetramine, acid mixtures presently used. The solutions also offer a concentration of formaldehyde equal to hexamethylene tetramine for hardening acid-type two-stage phenolic resins.

I claim:

1. A stable aqueous solution of up to 80% by weight of hexamethylene tetramine and formaldehyde containing an acidic material selected from mineral acids, organic acids or an acid reacting salt, in which solution the mole ratio of formaldehyde to hexamethylene tetramine is from 3.3:1 to 2:1, the mole ratio of acidic material to hexamethylene tetramine is at least 1:2, the pH of the solution is from 7.4 to 8.4, the density of the solution is about 1.15 to 1.35 grams per ml. and the viscosity is from 20 to 55 cp at 25°C.

2. A method for making a stable aqueous solution of up to about 80% by weight of hexamethylene tetramine and formaldehyde by making a slurry of hexamethylene tetramine in an aqueous solution of up to 60% by weight formaldehyde, the amount of formaldehyde to hexamethylene tetramine varying from 3.3:1 to 2:1, adding to said slurry an acidic material selected from mineral acids, organic acids or an acid reacting salt, the acidic material being added in the amount of one mole of acid to two moles of hexamethylene tetramine, and heating the mixture at a temperature between 60° and 90°C. until it becomes clear.

3. A stable aqueous solution of up to about 80% by weight of hexamethylene tetramine and formaldehyde by making a slurry of hexamethylene tetramine in an aqueous solution of up to 60% by weight formaldehyde, the amount of formaldehyde to hexamethylene tetramine varying from 3.3:1 to 2:1, adding to said slurry an acidic material selected from mineral acids, organic acids or an acid reacting salt, the acidic material being added in the amount of one mole of acid to two moles of hexamethylene tetramine, and heating the mixture at a temperature between 60° and 90°C. until it becomes clear.

4. The solution of claim 1 wherein the mole ratio is 2:1.

5. The solution of claim 3 wherein the mole ratio is 2:1.

6. The method of claim 2 wherein the temperature is 90°C. and the acidic material is selected from acetic acid, hydrochloric acid, or ammonium chloride.

* * * * *